United States Patent [19]

Jeng

[11] Patent Number: 4,902,160
[45] Date of Patent: Feb. 20, 1990

[54] JOINT FOR A BICYCLE FRAME

[75] Inventor: Tom Jeng, Tainan, Taiwan

[73] Assignee: Giant Manufacturing Co., Ltd., Taiwan

[21] Appl. No.: 309,876

[22] Filed: Feb. 14, 1989

[51] Int. Cl.[4] .................................................. F16B 1/00
[52] U.S. Cl. ....................................... 403/205; 403/403; 403/268; 280/281.1
[58] Field of Search .................... 403/205, 403, 268; 280/281.1

[56] References Cited

U.S. PATENT DOCUMENTS

| 932,546 | 8/1909 | Hedstrom | 403/186 X |
| 4,541,649 | 9/1985 | Grunfeld | 280/281.1 |
| 4,598,922 | 7/1986 | Kleinebenne | 280/281.1 |
| 4,721,407 | 1/1988 | Liu | 403/198 X |

Primary Examiner—Andrew V. Kundrat
Attorney, Agent, or Firm—Birch, Stewart Kolasch & Birch

[57] ABSTRACT

A joint is used for a bicycle frame. The joint includes a composite material first tubular member, and a metal second tubular member fitting having a laterally extending insertion portion. A coating is made of the same composite material as that of the first tubular member and is applied to the entire fitting, except for the end portion of the insertion portion. The first member is sleeved on and adhered to the end portion of the insertion portion and contacts the coating. The abutting surfaces of the coating and the first member are of the same outer and inner diameters so that the joint looks like a unitary composite material frame.

1 Claim, 3 Drawing Sheets

JOINT FOR A BICYCLE FRAME

BACKGROUND OF THE INVENTION

This invention relates to a bicycle frame having composite material tubes, more particularly to a joint for a bicycle frame.

Referring to FIG. 1, a common metal bicycle frame essentially includes a head tube 10, a seat tube 11, a top tube 12, a downtube 13, a seat stay 14 and a chain stay 15. Fittings 101, 102, 103, 104 and 105 are welded between the tubes 10, 11, 12, 13, 14, 15 and 16 of the bicycle frame. For example, the fitting 101 is disposed between the head tube 10 and the top tube 12 and between the head tube 10 and the downtube 13. It is understood that it is difficult to perform the welding process of these joints 101, 102, 103, 104 and 105. Furthermore, the joints are made unsightly as a result of the welding process. To overcome these disadvantages, this common bicycle frame was replaced with a unitary bicycle frame of a composite material, such as carbon fiber. To strengthen bicycle frames of a composite material, the curved portion between any pair of tubes is laminated. As a result of the laminating process, the cross-section area of the curved portion is increased making the manufacturing process inefficient and thereby raising manufacturing costs. Accordingly, it is desirable that suitable fittings are developed to interconnect available composite material tubes, e.g. a top tube, a downtube and a seat tube for a bicycle frame, so that the lightweight advantage of unitary composite material bicycle frames is still remained. U.S. Pat. Nos. 932,546 and 4,721,407 disclose a joint which includes a fitting with a tube sleeved and adhered thereon. Although the fittings of these patents may be used to interconnect available composite material tubes so that no welding is needed, they have the following disadvantages: (1) If they are made of a composite material, an unexpected laminating process is required; and (2) If they are made of a metal, the outer appearance of the bicycle frame is unsightly.

SUMMARY OF THE INVENTION

It is therefore the main object of this invention to provide an attractive joint for a bicycle frame which includes a metal fitting, a tube of a composite material sleeved on and adhered to a portion of the fitting, and a coating of said composite material applied to the remaining portion of the fitting so that the bicycle frame looks like a unitary composite material frame.

According to this invention, a joint for a bicycle frame includes a first tubular member of a composite material, a metal second tubular member having a laterally extending insertion portion on which an end portion of the first member is sleeved, an adhesive applied between the outer surface of the insertion portion of the second member and the inner surface of the end portion of the first member, and a coating of said composite material applied to the entire second member, except for the end portion of the insertion portion which is engaged with the first member, so that the joint looks like a unitary composite material frame. The insertion portion of the second member is closely engaged with the end portion of the first member and both the end portion of the first member and the coating on the insertion portion of the second member have abutting surfaces of the same size so that the outer surfaces of the first member and the coating are adjoined to form the smooth outer surface of the joint.

BRIEF DESCRIPTION OF THE DRAWINGS

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
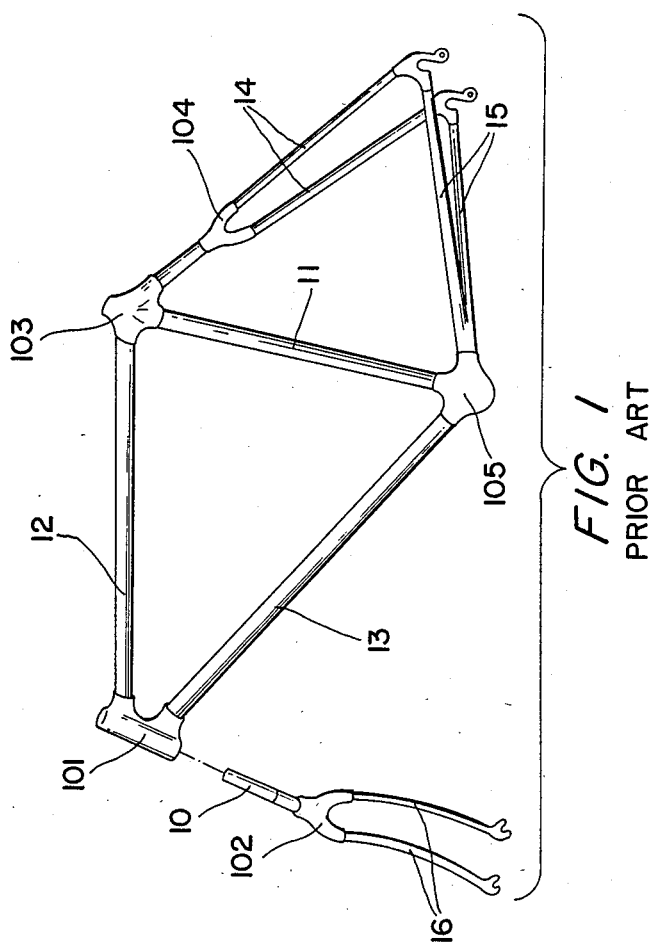
FIG. 1 is a schematic view of a conventional bicycle frame.
Figure 2:
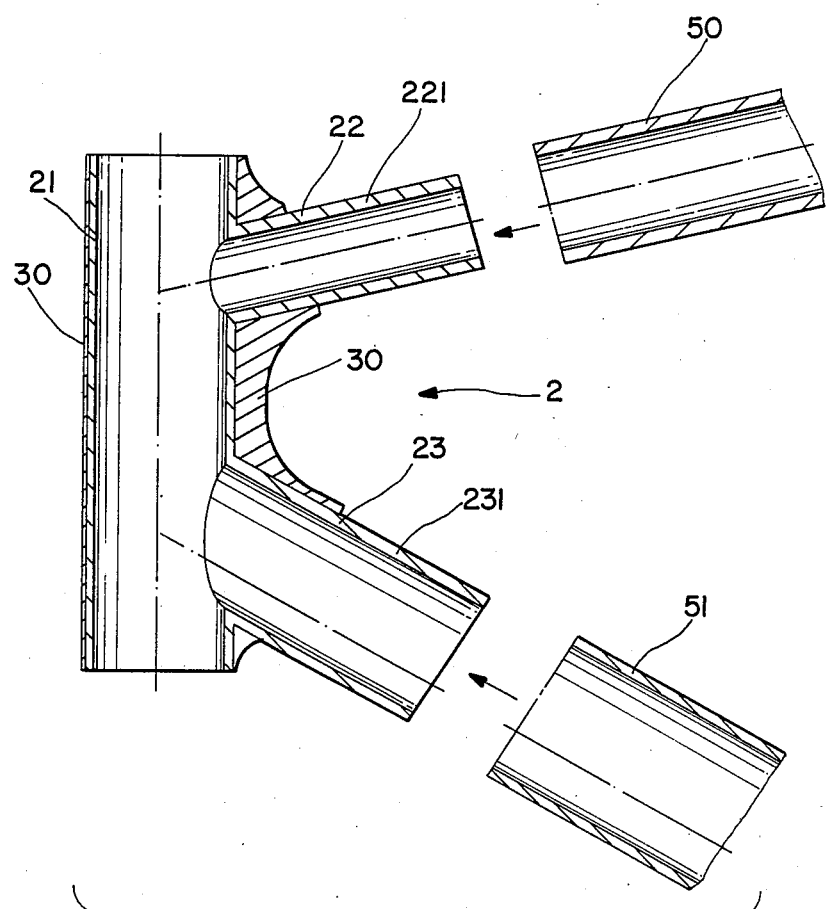
FIG. 2 is an exploded view of a joint for a bicycle frame according to this invention.

Referring to FIG. 2, a joint for a bicycle frame of this invention includes a composite material top tube 50, a composite material downtube 51, a metal fitting 2 interconnecting the top tube 50 and the downtube 51, and a coating 30 of the same composite material as that of both the top tube 50 and the downtube 51.

Figure 3:
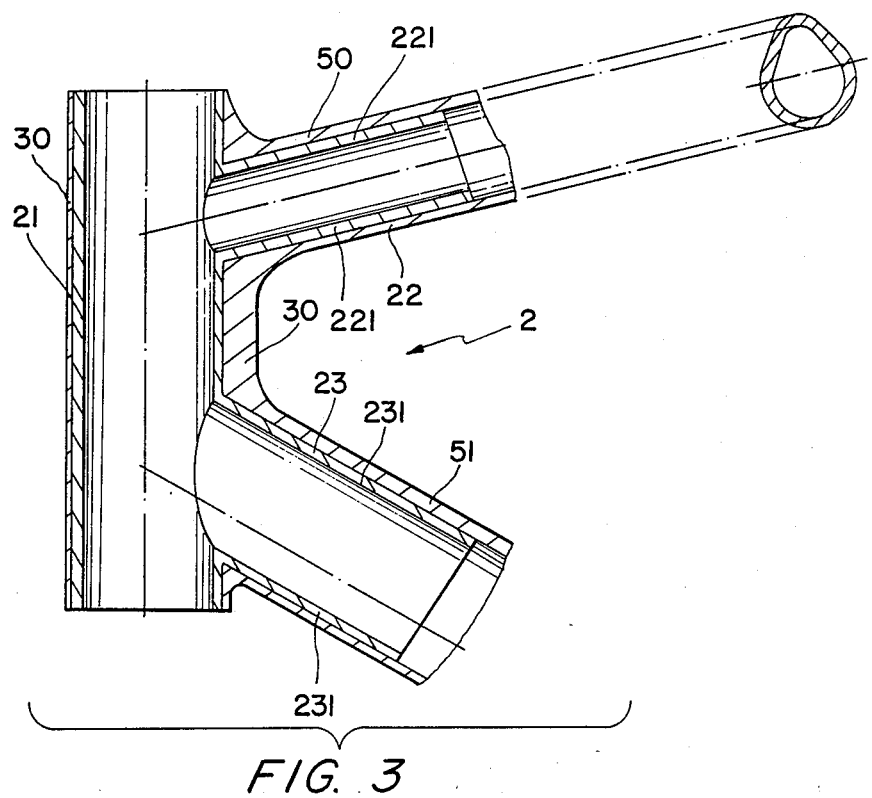
FIG. 3 is an assembled view showing the joint of this invention.

In this embodiment, the tubes 50, 51 are made of carbon fiber and are available in the market, while the fitting 2 is made of Cr-Mo alloy steel. The fitting 2 has an upright tubular member 21 from which a tubular upper insertion portion 22 and a tubular lower insertion portion 23 extend laterally. As shown in FIG. 3, the cross-sections of the top tube 50 and the downtube 51 are partially oval-shaped. The cross-sections of the insertion portions 22, 23 are also partially oval-shaped so as to match the tubes 50, 51.

In assembly, the coating 30 is applied or injected in a known manner onto the entire fitting 2 except for the end portions 221, 231 of the insertion portions 22, 23. Then, the available tubes 50, 51 are sleeved on the exposed end portions 221, 231 of the insertion portions 22, 23 in such a manner that they contact the coating 30. It should be understood that it is easy to manufacture the joint of this invention.

Because the interengaging surfaces of the coating 30 and the tubes 50, 51 are of the same thickness, the joint of this invention looks like a unitary composite material frame. Furthermore, the carbon fiber tubes 50, 51 reduce the weight of the joint.

With this invention thus explained, it is apparent that numerous modifications and variations can be made without departing from the scope and spirit of this invention. It is therefore intended that this invention be limited only as indicated in the appended claims.

I claim:

1. A joint for bicycle frame comprising a first tubular member of a composite material, a metal second tubular member having an outer surface and a laterally extending insertion portion on which an end portion of said first member is sleeved, an adhesive applied between an outer surface of said insertion portion of said second member and an inner surface of said end portion of said first member, and a coating of said composite material applied onto said outer surface of said second member except for an end portion of said insertion portion which is engaged within said first member in such a manner that said joint looks like a unitary composite material frame, said insertion portion of said second member being closely engaged with said end portion of said first member and both said end portion of said first member and said coating on said insertion portion of said second member having abutting end surfaces of the same size so that outer surfaces of said first member and said coating may be adjoined to form a smooth outer surface of said joint.

* * * * *